April 8, 1969  J. C. M. VACHON ET AL  3,437,988
MEANS FOR WARNING OF THE RELATIVE APPROACH
OF AN OBSTACLE IN THE PATH OF A VEHICLE
Filed Oct. 1, 1965

United States Patent Office 3,437,988
Patented Apr. 8, 1969

3,437,988
MEANS FOR WARNING OF THE RELATIVE APPROACH OF AN OBSTACLE IN THE PATH OF A VEHICLE
Jeannine C. M. Vachon, 12 Square Montsouris, and Henri N. Aubert, 23 Rue de l'Abbe Groult, Paris, France
Filed Oct. 1, 1965, Ser. No. 492,990
Claims priority, application France, July 5, 1965, 23,419
Int. Cl. G08g 1/14
U.S. Cl. 340—51                                       9 Claims

ABSTRACT OF THE DISCLOSURE

An obstacle detector, which detects the relative approach of a vehicle to an obstacle, having a fixed frequency oscillator and a variable frequency oscillator, the frequency of which varies because of a capacity change of a conductor responsive to approach of the obstacle. The outputs of the oscillators are combined and compared in a control unit and used to selectively energize a set of signal lights.

---

The present invention is related to means for warning of the relative approach of an obstacle in the path of a vehicle. The word "relative" means that the obstacle detector may be carried by the vehicle itself especially equipped for the purpose, or it may be fixed on the ground, while the vehicle has no special equipment. These two kinds of arrangement are herein contemplated as will appear further on.

In applicants' copending U.S. application Ser. No. 377,904 filed June 25, 1964 and now Patent 3,366,925, there is disclosed a device which is related to the first kind. Use is made in that case, and in the present invention as well, of the capacity variation of electric conductors—said variation resulting from the presence and the relative movement with respect to the obstacle—for modifying the functioning of an electrical cricuit and for deriving therefrom a signal that indicates the presence of the obstacle and its distance. Said electric conductors are for instance the bumpers, especially equipped and mounted in the present case, and particularly the rear bumpers, which allow backward driving of a lorry without seeing the obstacles. The device includes two oscillators, one having a fixed or practically fixed frequency and the other one being connected to said conductors or bumpers and having thus a frequency varying because of the change of its capacity due to the approach of an obstacle; the best of the two oscillations is then detected and exploited. In the case of the device disclosed in the above U.S. patent, the warning signal is of an acoustical nature.

Such a device has a number of drawbacks. First of all, if it is used for lorries which come for discharging goods at a fixed point, it is not necessary that each vehicle be equipped with an obstacle detector and it is preferable that the detector be located on the ground. Secondly, in order to evaluate the distance with a reasonable degree of certitude and ease of handling, the device has to be of relatively complicated structure as disclosed in said U.S. patent.

It is an object of the invention to build an obstacle detector of a simplified structure. Another object is an obstacle detector that permanently emits a signal, i.e. either a signal for authorizing the passage of the vehicle, or a signal for stopping it or for at least reducing its speed. Still another object is an obstacle detector in which at determined distances a different signal is issued in the stead of a precedent one. It is with the foregoing objects in view that in the invention the warning signal is of a luminous nature.

To this end the warning means according to the invention comprise a control unit which is sensitive to the frequency and the amplitude of the electric signals derived from the beat of the two above-mentioned oscillators, and a switch unit controlled by said control unit and controlling a set of signal lights situated so as to be well visible from the vehicle's driver.

The invention will be better understood by referring to an example of embodiment of the invention, illustrated by the annexed drawing in which.

Figure 1:
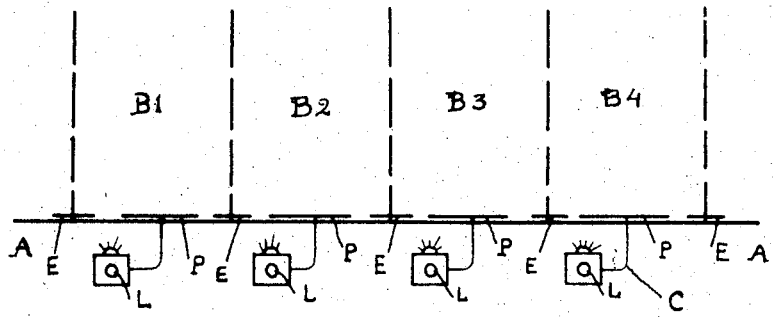
FIG. 1 shows the general arrangement of a discharge platform for lorries.
Figure 2:
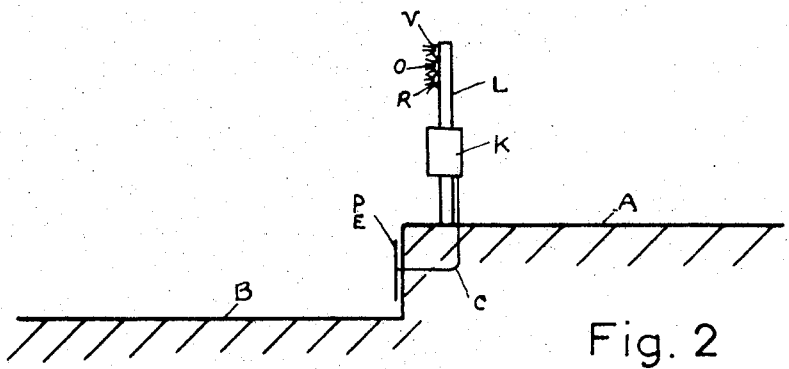
FIG. 2 is a cross section of said platform at an enlarged scale.

FIGS. 1 and 2 show a platform A at a higher level than the ground B on which roll the lorries which have to drive backward until they come to the platform to be discharged. These lorries are not necessarily fitted with a special equipment, which is provided for instance on the platform. Transversally to the platform the ground B is divided into a plurality of causeways or "stalls" B1, B2 ... B4 by fictious or even physical barriers (for example some chains or painted marks) which extend over a sufficient length, let us say 20 metres. The lorries must be driven within said stalls.

The vertical facade of the platform bears a plurality of feelers P in front of the stalls, as well as screening plates E between them. It is for instance admitted—although this is by no means compulsory—that the feelers P and the screens E are metal plates of the same height, so that they are confounded in the view of FIG. 2. On the platform itself stands a signalling light fixture L; it carries the signal lights V, O, R and a box K containing the circuits of the obstacle detector. They are connected to the feeler by a cable C and to the signal lights (through connections within the column of the fixture).

The plates E are directly connected to the ground. Thus they play the role of screens—although imperfectly, but sufficiently for practical purposes—that eliminate any appreciable spurious reaction between a vehicle and the stalls next to it. The screening action could be reinforced, if necessary, by providing screens on the barriers between the stalls.

In the situation represented for the signal light fixture L, i.e. on the left-hand edge of the causeway although on the platform, the signal lights are easily observable by the driver looking in his rear-view mirror. According to an alternative arrangement the signal lights could be as well placed or duplicated in another place; for example supported by a suspended container at about 5 to 10 metres or more ahead of the discharge platform, hanging over the vehicle, so that they could be directly observed by the driver looking before him from the moment when it is necessary to drive with a certain care.

It is here provided that the signal lights are similar to those used as traffic lights; they are namely:

(1) a green light V (free passage)
(2) an orange light O (slow speed with caution)
(3) a red light R (imperative stop)

These three lights are alternatively and automatically controlled by the device of the invention under the influence of the presence and approach of the vehicle. Normally the green light is on if the vehicle is very far from the platform, that is at a distance $x > x_0$. At a distance $x_0$ (practically=1 or 2 metres) the green light is obscured and the orange light is illuminated instead, and this lasts, as the vehicle draws near, till the security distance $x_1$ is attained (for instance $x_1=0.10$ m.). Then, when the vehicle draws nearer and the distance $x$ becomes less than $x_1$, the red light only is on.

At a great distance ($x>x_0$) both oscillators have practically the same frequency (for instance the varying one synchronises itself on the fixed one) and there is no beat.

When the distance $x$ is lessening, the beat appears and its frequency increases. The value $x_1$ corresponds to a high frequency which is rather well defined (about 3000 Hz.).

Moreover, it is very useful to introduce a reasonable degree of security in the device of the invention. It is not necessary to provide for a protection against an eventual lack of supply voltage (fault of current) for, as one of the signal lights is always on, the driver would be immediately aware of it. Thus it is a characteristic feature of the installation as herein disclosed that the equipment is continually in service. No mention will be given herein of the precautionary measures to be adopted in case of failure of the signal lamps themselves, for these measures are customary in road signalization. The variations of the capacity and insulation of the feelers P are provided for as will be explained further on. But without increasing too much the costs in proportion to the risks incurred by the vehicles it is easy to combine the use of green and red lights for checking the working of the essential parts of the device, namely the two oscillators.

Such an additional security implies a modification of the above-given conditions for controlling the switching of the signal lights, which will run as follows:

The green light V will be on both if the device is in good working order and if $x>x_0$. If the device does not work properly (that is, if at least one of the two oscillators does not practically oscillate) the red light appears instead. The other conditions enunciated (orange light on for $x_0>x>x_1$ and red light on for $x<x_1$) still apply if the working of the device is proper.

Figure 3:
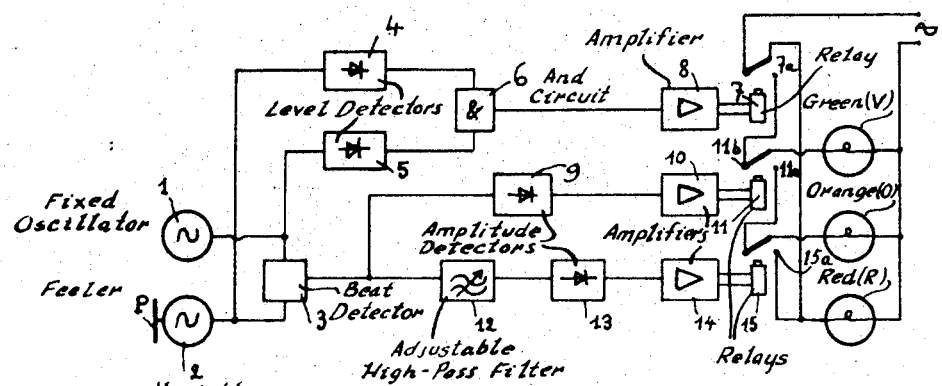
FIG. 3 is a schematic diagram of the obstacle detector.

FIG. 3 shows the different parts of the device of the invention and how it is possible to connect them.

1 indicates the fixed oscillator and 2 the oscillator coupled to the feeler P, the frequency of which will vary under the influence of an obstacle.

3 refers to a beat detector of any appropriate type, which is coupled to the two oscillators. 4 and 5 are level detectors respectively coupled to oscillators 1 and 2 and the rectified pulsations which they deliver are applied to an "AND" circuit 6 which feeds to relay 7 through the intermediate of an amplifier 8.

The signal delivered by beat detector 3 is transmitted through two channels: one of them feeds to relay 11 through the intermediate of an amplitude detector 9, endowed with a large time constant and a threshhold and eventually preceded by a low pass filter, and an amplifier 10; the other channel feeds to relay 15 through the intermediate of a high-pass, preferably adjustable filter 12, of an amplitude detector 13 with a threshold, and an amplifier 14.

The alternative contacts of the three relays 7, 11 and 15 are illustrated in FIG. 3 in a position of rest, in which the red light R is supplied by the mains. If the oscillators 1 and 2 are working, the circuit 6 detects a coincidence and the contact of relay 7 comes into 7a: this means that the green light will be on (the vehicle being supposed far from the platform). If at least one of the oscillators does not work the red light appears, ordering the driver that he sets the vehicle to a standstill or makes it recede.

Let us suppose now that oscillators 1 and 2 work properly. As soon as the vehicle draws near enough a beat appears; more precisely, immediately after unlocking of the two oscillators a 5 Hz. beat or so is produced and its frequency increases very rapidly. Because of the large time constant of detector 9 it delivers a sufficiently continuous voltage which energizes relay 11. The contact of the latter comes over to 11a, which feeds to light O.

Thus is obtained a luminous warning device, fixed to the ground, which can be used instead of an acoustical warning device carried by a vehicle. Naturally other circuits could be used. In particular, the circuits of the device described in said U.S. patent could be adopted; in that case it would be possible to derive additionally a sound signal which could be sent back to the driver in his cabin through the intermediary of a very simplified radio link.

As regards the influence of the variations of the impedances (capacitances and insulation resistances) of the feeler or of the linking cables, they will result in a modification of the adjustments, i.e. of the value of $x_1$. To compensate for this it suffices to adjust the frequency of oscillator 2 by acting on its tuning condenser.

Other modifications of the invention are still possible in the scope of the invention. In particular, for reducing costs it is possible to omit all the elements in relation to the orange light (parts 9 through 11 and light O), and the device would work with only two lights V and R. Also for reducing costs, the security parts 4 through 8 could be suppressed and the moving contact of relay 11 would be then directly fed from the mains at 11b. The combination of relays 7-11-15 could be replaced by any equivalent logic circuit with semiconductors or the like.

Also it is possible to use in a lorry fitted with special bumpers or conductors a device constituted and wired according to FIG. 3 or a like device; in that case, the dash board of the lorry for instance could be fitted with three small signal lights V, O, R playing the same part as the loudspeaker in the above mentioned U.S. patent.

What we claim is:

1. Means for deriving a warning signal from the beat of the two oscillators of an obstacle detector which detects the relative approach of an obstacle in the path of a vehicle, one of the oscillators having a fixed frequency whereas the frequency of the other oscillator varies because of the capacity change of a conductor coupled thereto as a consequence of the relative approach of the obstacle, and a beat detector being coupled to both oscillators, said means comprising a control unit that is sensitive to the frequency and the amplitude of the electric signals applied thereto, electrical connections for connecting the output of the beat detector to the input of the control unit, a switch unit, electrical connections for connecting the switch unit to the control unit, so as to control the former by the latter, a set of signal lights with a set of corresponding connections to the switch unit for selectively illuminating either one or the other of said lights under control of said switch unit.

2. Means for producing a warning signal as claimed in claim 1, in which the control unit is made of a high-pass filter and an amplitude detector with a threshold, together with electric connection means for connecting them in series.

3. Means for producing a warning signal as claimed in claim 1, in which the control unit is an alternative contact element and in which the set of signal lights comprises two lights having a different appearance, one for authorizing the passage of the vehicle and the other one for ordering its stopping, the connection means between the lights and said element being arranged for ordering the illumination of either one or the other of said lights according to the state of this element.

4. Means for deriving a warning signal from the beat of the two oscillators of an obstacle detector which detects the relative approach of an obstacle in the path of a vehicle, one of the oscillators having a fixed frequency whereas the frequency of the other oscillator varies because of the capacity change of a conductor coupled thereto as a consequence of the relative approach of the obstacle and a beat detector being coupled to both oscillators, said means comprising a high-pass filter, an amplitude detector with a threshold, a switch unit including two switching elements, electrical connections for connecting the output of the beat detector to the input of the filter, the output of the filter to the input of the amplitude detector and the output of the ampliude detector to one of the switching elements, a set of signal lights including three lights having a different appearance, one for authorizing the free passage of the vehicles without any limitation, another one for recommending slow driving with caution and the third one for ordering the stopping of the vehicle, a second amplitude detector with a threshold and a large time constant, connections for connecting the output of the beat detector to the input of said second detector and the output of said second detector to the other switching element and connection means that link the signal lights to the switch unit for controlling the illumination of one only of said lights in terms of the possible states of the switching elements, namely the free passage light if no one of the switching elements is energized, the caution driving light if the second switching element is energized and the stop light if both switching elements are energized.

5. Means for producing a warning signal as claimed in claim 4, in which the switch unit includes a third switching element, comprising means sensitive to the high frequency oscillations for permanently testing the working of the oscillators and consequently controlling said third switching element, and connection means for connecting at least the stop light to said third element, thereby illuminating the stop light as this third element is energized.

6. Fixed device for signalling the approach of a mobile vehicle, comprising an electric feeler conductor situated at a place towards which a vehicle draws near and connected to a first oscillator, a second oscillator having a fixed frequency, a detector of the beat of the oscillators, a control unit sensitive to the frequency and the amplitude of the electric signals applied thereto, electrical connections for feeding the electric beat signal to the control unit, a switch unit, electrical connections for connecting the switch unit to the control unit so as to control the former by the latter, a set of signal lights placed outside the vehicle and so as to be visible by the vehicle's driver, electrical connections between the switch unit and the set of signal lights for selectively illuminating the latter under the control of the switch unit.

7. Fixed device as claimed in claim 6, standing at about the edge of a platform supporting the feeler conductor, so that the vehicle's driver may see the signal lights in his rear view mirror when driving his vehicle backwards.

8. Fixed device as claimed in claim 6 for vehicles arriving rearwards, placed at about the edge of a platform supporting the feeler conductor, in which the signal lights are placed ahead at least five metre's distance from the feeler.

9. Combined, fixed installation comprising a plurality of devices similar to that of claim 8 and in which the vehicles have to arrive along a plurality of corresponding ways, transverse with respect to the platform, comprising electric conductors that are electrically connected to earth between the feelers of the ways.

References Cited
UNITED STATES PATENTS 3,103,655    9/1963    Jones _____ 340—258
3,164,802    1/1965    Kleist et al. _____ 340—258 XR ALVIN H. WARING, *Primary Examiner.*

U.S. Cl. X.R.

317—137, 146; 331—65; 340—258